UNITED STATES PATENT OFFICE.

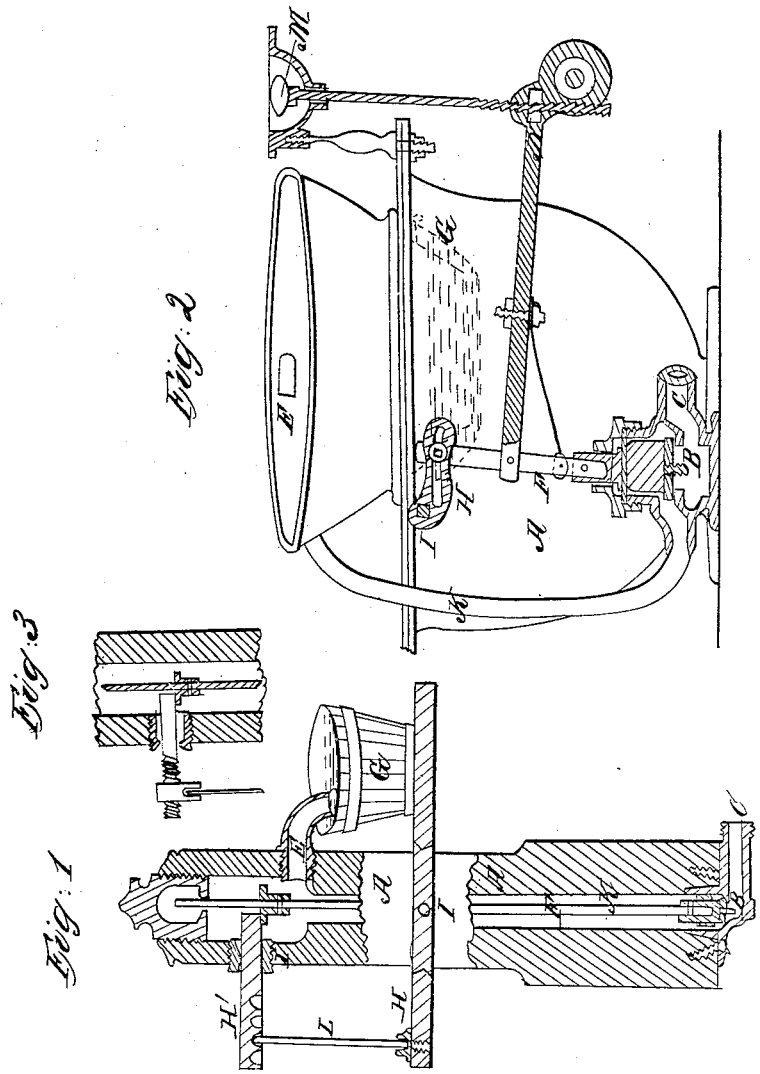
F. H. Bartholomew,
Water-Closet Valve.
Nº 34,288.  Patented Feb. 4, 1862.
Witnesses
H. A. Riley
J. H. Bartholomew
Inventor:
F. H. Bartholomew

FREDERICK H. BARTHOLOMEW, OF NEW YORK, N. Y.

IMPROVEMENT IN VALVE-REGULATORS.

Specification forming part of Letters Patent No. 34,288, dated February 4, 1862.

*To all whom it may concern:*

Be it known that I, FREDERICK H. BARTHOLOMEW, of the city, county, and State of New York, have invented a new and Improved Method of Regulating the Discharge of Water under Pressure into an Open Vessel from which the Water is Removed for any Purpose; and I do hereby declare that the following is a full, clear, and exact description of the same, refence being had to the accompanying drawings, and to the letters of reference marked thereon.

The object of my invention is to determine the stopping of the discharge of water under pressure into an open vessel from which water may be removed for any purpose, so as to prevent waste; and the first part of my invention consists in combining the valve or cock that controls the discharge of water under pressure with the open vessel into which the water is received by means of mechanism operating in such manner that the discharge of water is stopped as soon as the open vessel is filled to a predetermined limit by the action of the weight of the water therein.

The object of the second part of my invention is to facilitate the adjustment of the combined mechanism between the open vessel and the valve or cock for the purpose of regulating the quantity with which the open vessel is to be filled before the discharge is to be stopped. This part of my invention consists in arranging the handle whereby the said valve or cock is opened with the mechanism that combines the open vessel with the said valve or cock in such manner that the said handle is available for the double purpose of opening said valve and adjusting the said combined mechanism.

My invention is applicable to any open vessel into which water is discharged under pressure and from which the water is removed, whether by dipping, tipping, or other means. It is particularly applicable to hydrants fitted with open vessels or basins from which water is dipped or is drank by animals, as it prevents waste from ovreflowing the vessel, and also by closing the valve or cock gradually prevents the injurious effect of the water-hammer on the supply-pipe. The invention is also applicable to the open tipping hopper or pan of a water-closet with the same useful results.

An application of the invention to a hydrant with an open receiving-vessel from which the water is used is shown in the accompanying drawings at Figure 1, where the open vessel G is represented as supported beneath the discharge-nozzle E of the hydrant upon a lever-platform H, that is pivoted at I to the trunk A of the hydrant. The water enters at the lower end of the hydrant by the supply-pipe C, which is fitted with a valve B, that closes against the pressure of the water. The valve B is combined with the open vessel by means of the lever H, the rod L, the lever-handle H', and the valve-stem F, and the leverage is adjusted by shifting the upper end of the rod L from one socket to another in the lever-handle H' until the weight of the open vessel G, when filled to the predetermined limit, is sufficient to effect the closing of the valve B against the pressure of the water. From the combination of devices thus described it is clear that so long as the open vessel remains filled to the predetermined limit the supply-valve will remain closed; but if water be removed from the vessel by dipping or other means the pressure of the water at the supply-pipe will open the valve and the vessel will be replenished. As this operation proceeds, the weight in the vessel gradually accumulates and recloses the valve as soon as the water again fills the open vessel to the predetermined limit. The stopping of the discharge is therefore determined by the weight of the water in the open vessel. In place of employing a socketed handle H' as a means of adjusting the quantity of water discharged a screw-formed handle may be employed, as shown at Fig. 3.

The application of my said invention to a water-closet is shown at Fig. 2, where the water is withdrawn from the open vessel by tipping it. In this case the open vessel G forms one arm of a lever whose fulcrum is a rock-shaft I and whose other arm H is connected by a rod F with the valve B of the supply-pipe C. The arm H is slotted to receive a pin at the upper end of the valve-rod F. The valve-rod is connected with a weighted lever N, whose tendency is to move the pin toward the outer end of the slotted arm H, and the weighted lever is connected by a screw-rod with the handle M, whose downward movement by the weight is limited by the socket-plate through which the handle-rod works. In this case the valve B is combined with the open vessel by means of the valve-rod, the arm H, and the rock-shaft I, and the leverage is adjusted by screwing the rod of the handle M more or less into the weighted lever N (whereby the pin at the top of the valve-rod is set at a less or greater distance from the rock-shaft when the handle is at rest upon its socket-plate) until the weight of the open vessel when filled to the predetermined limit is sufficient to effect the closing of the valve against the pressure of the water. It will be perceived that in this case, as in the preceding example, so long as the open vessel G remains filled to the predetermined limit the valve will remain closed; but if the water be removed from the open vessel by permitting it to tip, which is readily done by raising the handle M, the weight of the empty vessel when the handle returns to its place of rest will not be sufficient to hold the valve closed against the pressure of the water in the supply-pipe. Hence the valve will be opened by the pressure of the water, and the vessel will be replenished, the closing of the valve taking place, as before, as soon as the water fills the open vessel to the predetermined limit, and the stopping of the discharge being determined, as before, by the weight of the water in the open vessel.

In both cases above described the handle is used for the double purpose of opening the supply-valve and of adjusting the discharge of the water, and this adjustment may be made either to vary the height to which the open vessel is filled or to compensate a variation in the pressure in the supply-pipe.

Having thus described two examples embodying my improvement, I may state that I do not limit it to the particular forms of valves or cocks herein described; but

What I claim as my invention, and desire to secure by Letters Patent, is—

1. The combination of an open vessel from which water may be removed with a valve that controls the discharge of the water under pressure into said open vessel by mechanism substantially as described, so that the weight of water in the open vessel determines the closing of the valve.

2. The combination of the handle by which the valve is opened, with the mechanism above described, and with the open vessel and with the valve in such manner that the said handle is made available both to open the valve and to adjust the said mechanism, substantially as described.

FREDK. H. BARTHOLOMEW.

Witnesses:
H. A. RILEY,
J. H. BARTHOLOMEW.